US012304493B2

(12) United States Patent
Lee et al.

(10) Patent No.: US 12,304,493 B2
(45) Date of Patent: May 20, 2025

(54) CONTROL OF TRANSITIONS BETWEEN TRANSMISSION STATES

(71) Applicant: GM GLOBAL TECHNOLOGY OPERATIONS LLC, Detroit, MI (US)

(72) Inventors: Chunhao J. Lee, Troy, MI (US); Dongxu Li, Troy, MI (US); Farzad Samie, Franklin, MI (US); Paul Guillermo Otanez, Franklin, MI (US); Su-Yang Shieh, Clawson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 167 days.

(21) Appl. No.: 18/187,308

(22) Filed: Mar. 21, 2023

(65) Prior Publication Data

US 2024/0317235 A1   Sep. 26, 2024

(51) Int. Cl.
*B60W 30/19* (2012.01)
*B60W 10/08* (2006.01)
(Continued)

(52) U.S. Cl.
CPC ............ *B60W 30/19* (2013.01); *B60W 10/08* (2013.01); *B60W 10/115* (2013.01);
(Continued)

(58) Field of Classification Search
CPC .... B60W 10/08; B60W 10/115; B60W 30/18; B60W 30/18163; B60W 30/19;
(Continued)

(56) References Cited

U.S. PATENT DOCUMENTS

| 7,497,285 | B1 * | 3/2009 | Radev | B60K 6/52 |
| | | | | 180/65.23 |
| 11,493,127 | B2 | 11/2022 | Chen et al. | |

(Continued)

FOREIGN PATENT DOCUMENTS

| BR | 112015024709 B1 * | 1/2023 | ............... B60K 1/02 |
| CA | 3000362 A1 * | 10/2018 | ......... B60H 1/00378 |

(Continued)

OTHER PUBLICATIONS

German Office Action for German Application No. 102024107411.6; dated Oct. 29, 2024; 5 pages.

*Primary Examiner* — Atul Trivedi
(74) *Attorney, Agent, or Firm* — CANTOR COLBURN LLP

(57) ABSTRACT

A system for controlling a transmission state of a vehicle includes a controller connected to a first drive system and a first transmission including a gear system, a first clutch and a second clutch. The controller is configured to receive a request to change from an initial transmission state to a target transmission state when a propulsion torque is applied to the vehicle. The controller is configured to distribute the propulsion torque such that all of the propulsion torque is applied by a second drive system and the first drive system does not provide any propulsion torque to the vehicle, fully release an off-going clutch from the gear system, control a motor speed based on a rotational speed relation of the target transmission state to reduce a slip speed of the on-going clutch, and fully engage an on-coming clutch to put the first drive system in the target transmission state.

20 Claims, 6 Drawing Sheets

(51) Int. Cl.
  *B60W 10/115* (2012.01)
  *F16H 61/04* (2006.01)
(52) U.S. Cl.
  CPC ..... *F16H 61/0403* (2013.01); *B60W 2510/10* (2013.01); *B60W 2710/081* (2013.01); *B60W 2710/1005* (2013.01); *F16H 2061/0422* (2013.01)
(58) Field of Classification Search
  CPC ....... B60W 2510/10; B60W 2710/081; B60W 2710/1005; F16H 61/0403; F16H 2061/0422; F16H 2200/0021; F16H 2200/2005
  USPC .......................................................... 701/22
  See application file for complete search history.

(56) References Cited

U.S. PATENT DOCUMENTS

| | | | | |
|---|---|---|---|---|
| 2002/0033059 | A1* | 3/2002 | Pels | B60W 10/08 903/905 |
| 2010/0275712 | A1* | 11/2010 | Economou | F16H 3/363 29/893.1 |
| 2012/0329593 | A1* | 12/2012 | Larrabee | B64D 27/04 903/910 |
| 2013/0030628 | A1* | 1/2013 | Patel | B60W 20/00 701/22 |
| 2014/0358340 | A1* | 12/2014 | Radev | B60W 10/26 180/65.265 |
| 2015/0018167 | A1* | 1/2015 | Toyoda | B60W 10/08 476/11 |
| 2017/0334280 | A1* | 11/2017 | Lecomte | B60K 6/48 |
| 2017/0349041 | A1* | 12/2017 | Brehmer | F16H 3/663 |
| 2020/0114885 | A1* | 4/2020 | Pursifull | B60W 30/1884 |
| 2021/0188075 | A1* | 6/2021 | Mock | B60W 20/10 |
| 2021/0341036 | A1* | 11/2021 | Mock | F16D 11/10 |
| 2022/0063592 | A1* | 3/2022 | Badreddine | B60W 30/188 |
| 2024/0140391 | A1* | 5/2024 | Kawamata | B60K 23/0808 |
| 2024/0317203 | A1* | 9/2024 | Lindberg | B60W 10/02 |
| 2024/0318700 | A1* | 9/2024 | Hoff | F16D 13/52 |
| 2024/0322660 | A1* | 9/2024 | Mathew | H02K 7/116 |
| 2024/0343113 | A1* | 10/2024 | Houser | B60K 23/0808 |
| 2024/0343124 | A1* | 10/2024 | Berg | F16H 61/0213 |
| 2024/0343251 | A1* | 10/2024 | Ståhl | B60W 10/18 |
| 2024/0343258 | A1* | 10/2024 | Sovenyi | B60L 3/0061 |
| 2024/0351415 | A1* | 10/2024 | Engerman | B60K 17/16 |
| 2024/0351433 | A1* | 10/2024 | Wolfgramm | B60K 17/16 |
| 2024/0353003 | A1* | 10/2024 | Mollier | F16H 63/30 |
| 2024/0355154 | A1* | 10/2024 | Xie | G07C 5/0808 |

FOREIGN PATENT DOCUMENTS

| | | | | |
|---|---|---|---|---|
| CN | 107407391 A | * | 11/2017 | ............ F16H 48/24 |
| DE | 102023107082 A1 | * | 9/2024 | |
| EP | 4434797 A1 | * | 9/2024 | ............... B60L 15/20 |
| EP | 3587160 B1 | * | 10/2024 | ................ B60K 1/02 |
| FR | 3146857 A1 | * | 9/2024 | ............... B60W 30/14 |
| WO | WO-2024194918 A1 | * | 9/2024 | |
| WO | WO-2024194925 A1 | * | 9/2024 | |
| WO | WO-2024194935 A1 | * | 9/2024 | |
| WO | WO-2024195403 A1 | * | 9/2024 | |
| WO | WO-2024201798 A1 | * | 10/2024 | |
| WO | WO-2024201801 A1 | * | 10/2024 | |
| WO | WO-2024201813 A1 | * | 10/2024 | |

* cited by examiner

CONTROL OF TRANSITIONS BETWEEN TRANSMISSION STATES

INTRODUCTION

The subject disclosure relates to vehicles, and more specifically, to systems, devices and methods for control of vehicle transmissions.

Vehicles, including gasoline and diesel power vehicles, fuel cell vehicles, as well as electric and hybrid electric vehicles, feature battery storage for purposes such as powering electric motors, electronics and other vehicle subsystems. Electric vehicles may feature single drive systems, or multi-drive systems that include two or more electric motors for applying torque. For example, some vehicles include a drive system for controlling torque applied to rear wheels, and another drive system for controlling torque to front wheels.

SUMMARY

In one exemplary embodiment, a system for controlling a transmission state of a vehicle includes a controller connected to a first drive system and a first transmission connected to the first drive system, the first drive system including an electric motor, the first transmission including a gear system, a first clutch and a second clutch. The controller is configured to receive a request to change from an initial transmission state to a target transmission state when a propulsion torque is being applied to the vehicle, where one of the first clutch and the second clutch is an off-going clutch that is engaged with the gear system in the initial transmission state, and another of the first clutch and the second clutch is an on-coming clutch that is disengaged from the gear system in the initial transmission state. The controller is also configured to distribute the propulsion torque such that all of the propulsion torque is applied by a second drive system and the first drive system does not provide any propulsion torque to the vehicle, fully release the off-going clutch from the gear system, control a motor speed based on a rotational speed relation of the target transmission state to reduce a slip speed of the on-coming clutch, and fully engage the on-coming clutch to put the first drive system in the target transmission state.

In addition to one or more of the features described herein, the controller is further configured to re-distribute the propulsion torque so that at least a portion of the propulsion torque is applied by the first drive system.

In addition to one or more of the features described herein, the controller is further configured to re-distribute the propulsion torque such that the second drive system does not provide any propulsion torque to the vehicle, the second drive system connected to a second transmission, and change a transmission state of the second transmission from a first transmission state to a second transmission state.

In addition to one or more of the features described herein, the gear system includes a carrier rotationally coupled to the electric motor and supporting a plurality of planet gears, a sun gear, and a ring gear rotationally coupled to an output of the transmission, and wherein the first clutch is operable to immobilize the sun gear, and the second clutch is operable to rotationally couple the electric motor and the carrier to the ring gear.

In addition to one or more of the features described herein, the first transmission has a low gear state in which the first clutch is the off-going clutch and the second clutch is the on-coming clutch, and a high gear state in which the first clutch is the on-coming clutch and the second clutch is the off-going clutch.

In addition to one or more of the features described herein, the initial transmission state is the low gear state and the target transmission state is the high gear state, and controlling the motor speed includes reducing the motor speed to match the motor speed to a rotational speed of the ring gear.

In addition to one or more of the features described herein, the initial transmission state is the high gear state and the target transmission state is the low gear state, and controlling the motor speed includes increasing the motor speed based on the rotational speed relation of the low gear state.

In addition to one or more of the features described herein, the controller includes a first controller configured to control the rotational speed of the electric motor and a second controller configured to control operation of the first transmission.

In addition to one or more of the features described herein, the system is configured to control the transmission state based on coordination between the first controller and the second controller.

In another exemplary embodiment, a method of controlling a transmission state of a vehicle includes receiving at a controller a request to change from an initial transmission state to a target transmission state when a propulsion torque is being applied to the vehicle, the controller connected to a first drive system and a first transmission, the first drive system including an electric motor, the first transmission including a gear system, a first clutch and a second clutch. One of the first clutch and the second clutch is an off-going clutch that is engaged with the gear system in the initial transmission state, and another of the first clutch and the second clutch is an on-coming clutch that is disengaged from the gear system in the initial transmission state. The method also includes distributing the propulsion torque such that all of the propulsion torque is applied by a second drive system and the first drive system does not provide any propulsion torque to the vehicle, fully releasing the off-going clutch from the gear system, controlling a motor speed based on a rotational speed relation of the target transmission state to reduce a slip speed of the on-coming clutch, and fully engaging the on-coming clutch to put the first drive system in the target transmission state.

In addition to one or more of the features described herein, the method further includes re-distributing the propulsion torque so that at least a portion of the propulsion torque is applied by the first drive system.

In addition to one or more of the features described herein, the method further includes re-distributing the propulsion torque such that the second drive system does not provide any propulsion torque to the vehicle, the second drive system connected to a second transmission, and changing a transmission state of the second transmission from a first transmission state to a second transmission state.

In addition to one or more of the features described herein, the gear system includes a carrier rotationally coupled to the electric motor and supporting a plurality of planet gears, a sun gear, and a ring gear rotationally coupled to an output of the transmission, and wherein the first clutch is operable to immobilize the sun gear, and the second clutch is operable to rotationally couple the electric motor and the carrier to the ring gear.

In addition to one or more of the features described herein, the first transmission has a low gear state in which the first clutch is the off-going clutch and the second clutch is the on-coming clutch, and a high gear state in which the first clutch is the on-coming clutch and the second clutch is the off-going clutch.

In addition to one or more of the features described herein, the initial transmission state is the low gear state and the target transmission state is the high gear state, and controlling the motor speed includes reducing the motor speed to match the motor speed to a rotational speed of the ring gear.

In addition to one or more of the features described herein, the initial transmission state is the high gear state and the target transmission state is the low gear state, and controlling the motor speed includes increasing the motor speed based on the rotational speed relation of the low gear state.

In yet another exemplary embodiment, a vehicle system includes a first drive system, a first transmission coupled to the first drive system, and a processing device for executing computer readable instructions from a memory, the computer readable instructions controlling the processing device to perform a method. The method includes receiving at a controller a request to change from an initial transmission state to a target transmission state when a propulsion torque is being applied to a vehicle, the controller connected to the first drive system and the first transmission, the first drive system including an electric motor, the first transmission including a gear system, a first clutch and a second clutch. One of the first clutch and the second clutch is an off-going clutch that is engaged with the gear system in the initial transmission state, and another of the first clutch and the second clutch is an on-coming clutch that is disengaged from the gear system in the initial transmission state. The method also includes distributing the propulsion torque such that all of the propulsion torque is applied by a second drive system and the first drive system does not provide any propulsion torque to the vehicle, fully releasing the off-going clutch from the gear system, controlling a motor speed based on a rotational speed relation of the target transmission state to reduce a slip speed of the on-coming clutch, and fully engaging the on-coming clutch to put the first drive system in the target transmission state.

In addition to one or more of the features described herein, the gear system includes a carrier rotationally coupled to the electric motor and supporting a plurality of planet gears, a sun gear, and a ring gear rotationally coupled to an output of the transmission, and wherein the first clutch is operable to immobilize the sun gear, and the second clutch is operable to rotationally couple the electric motor and the carrier to the ring gear.

In addition to one or more of the features described herein, the first transmission has a low gear state in which the first clutch is the off-going clutch and the second clutch is the on-coming clutch, and a high gear state in which the first clutch is the on-coming clutch and the second clutch is the off-going clutch.

In addition to one or more of the features described herein, controlling the motor speed includes at least one of reducing the motor speed to match the motor speed to a rotational speed of the ring gear based on the initial transmission state being the low gear state and the target transmission state being the high gear state, and increasing the motor speed based on the rotational speed relation of the low gear state based on the initial transmission state being the high gear state and the target transmission state being the low gear state.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
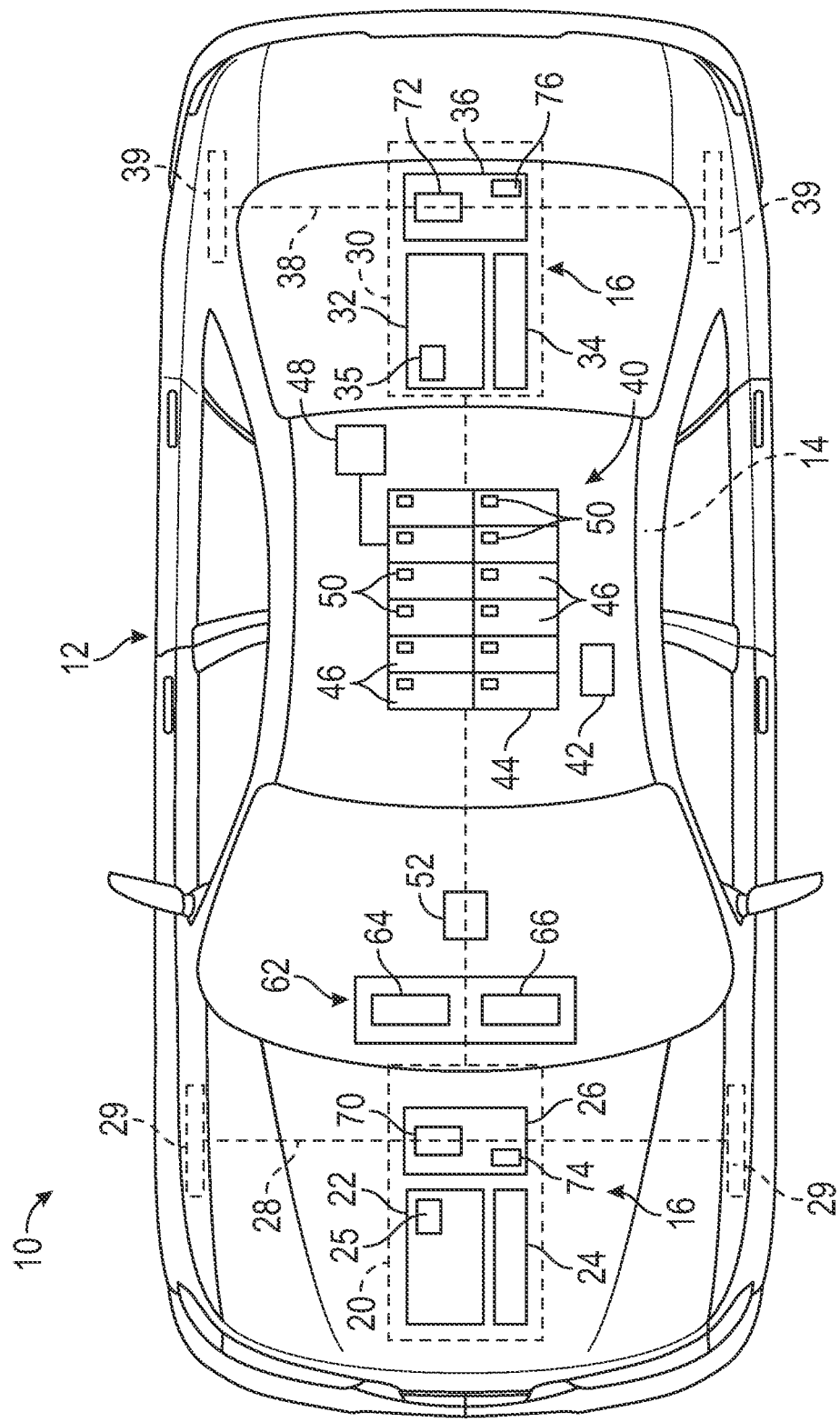
FIG. 1 is a top view of a motor vehicle including a multi-drive system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with exemplary embodiments, methods, devices and systems are provided for control of one or more transmission systems (i.e., transmissions) in a vehicle, such as an electric vehicle or hybrid vehicle. An embodiment of a method includes receiving a request to shift between transmission states (e.g., a low gear state and a high gear state) in a first drive system of a multi-drive system vehicle. Prior to performing the shift, propulsion torque (i.e., torque applied to drive the vehicle) is distributed to one or more other drive systems so that the first drive system is not providing any torque to the vehicle, and the shift can be completed under zero or minimum torque.

After the torque is distributed, the shift is then initiated by opening an engaged clutch (an "off-going clutch"), for example by fully releasing or "dumping" the off-going clutch. Once the off-going clutch is fully disengaged, a speed matching process is performed, during which a rotational speed of a motor ("motor speed") in the drive system is controlled until the motor speed matches an output speed of the transmission, and a clutch to be engaged (an "on-coming clutch") has zero slip speed. The on-coming clutch is then fully engaged to put the first drive system into the requested transmission state.

In an embodiment, if it is desired to shift the transmission state of the one or more other drive systems, the method is repeated for each other drive system by distributing torque away from a shifting drive system and performing a shift as discussed above. Other embodiments include performing the method by coordinating operations of different controllers in a vehicle so that shifting operations can be completed quickly, efficiently and smoothly.

Embodiments described herein present numerous advantages and technical effects. The embodiments provide for precise clutch and motor controls in coordination to increase efficiency and drive quality (e.g., smoothness of shift). In addition, the embodiments simplify hardware designs, thereby improving reliability. Other advantages include reductions in clutch wear.

The embodiments are not limited to use with any specific vehicle and may be applicable to various contexts. For example, embodiments may be used with automobiles, trucks, aircraft, construction equipment, farm equipment, automated factory equipment and/or any other device or system having a transmission. In addition, although embodiments are described in conjunction with a vehicle having two drive systems, embodiments are applicable to vehicles having a single electric drive system or having any number of drive systems.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and if the vehicle is a hybrid electric vehicle, a fuel injection subsystem, an exhaust subsystem and others.

The vehicle 10 may be an electrically powered vehicle (EV), a hybrid vehicle or any other vehicle that features multiple electric motors or drive systems. In an embodiment, the vehicle 10 is an electric vehicle that includes multiple motors and/or drive systems. For example, the propulsion system 16 is a multi-drive system that includes a first drive system 20 and a second drive system 30. The first drive system 20 includes a first electric motor 22 (which may be in the form of a motor generator unit or MGU) and a first inverter 24, as well as other components such as a cooling system. The first drive system 20 may include one or more controllers, such as a motor control module 25 (also referred to as a motor control processor or MCP 25).

The first drive system 20 is connected to a transmission system 26 that includes a gearbox 70 for controlling transfer of torque from the first motor 22 to a drive shaft 28. The drive shaft is connected to front wheels 29. The transmission system 26 may include one or more controllers, such as a transmission control module (TCM) 74.

The second drive system 30 includes a second electric motor 32 and a second inverter 34, and other components such as a cooling system. The second drive system 30 may include one or more controllers, such as a MCP 35. The second drive system 30 is connected to a transmission system 36 that includes a gearbox 72 for controlling transfer of torque from the second motor 32 to rear wheels 39 via a drive shaft 38. The transmission system 36 may also include one or more controllers, such as a TCM 76.

The inverters 24 and 34 (e.g., traction power inverter units or TPIMs) each convert direct current (DC) power from a high voltage (HV) battery pack 44 to poly-phase (e.g., two-phase, three-phase, six-phase, etc.) alternating current (AC) power to drive the motors 22 and 32.

As shown in FIG. 1, the drive systems 20 and 30 are configured such that the first electric motor 22 drives the front wheels 29 and the second electric motor 32 drives the rear wheels 39. However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

The drive system 20 and the drive system 30 are electrically connected to a battery system 40, and may also be electrically connected to other components, such as vehicle electronics (e.g., via an auxiliary power module or APM 42). The battery system 40 may be configured as a rechargeable energy storage system (RESS).

In an embodiment, the battery system 40 includes a battery assembly such as the battery pack 44. The battery pack 44 includes a plurality of battery modules 46, where each battery module 46 includes a number of individual cells (not shown). The battery system 40 may also include a monitoring unit 48 configured to receive measurements from sensors 50. Each sensor 50 may be an assembly or system having one or more sensors for measuring various battery and environmental parameters, such as temperature, current and voltages.

Any of various processing devices or controllers can be used to control the drive systems and transmission systems. A controller includes any suitable processing device or unit, and may be a dedicated controller such as a controller 52.

In an embodiment, the methods described herein are performed by one or more existing controllers connected to each drive system. For example, aspects of shifting the transmission system 26 may be performed by the MCP 25 in coordination with the TCM 74, and aspects of shifting the transmission system 36 may be performed by the MCP 35 in coordination with the TCM 76.

The vehicle 10 also includes a computer system 62 that includes one or more processing devices 64 and a user interface 66. The computer system 62 may communicate with the controller 52 and/or other processor(s), for example, to provide commands thereto in response to a user input. The various processing devices, modules and units may communicate with one another via a communication device or system, such as a controller area network (CAN) or transmission control protocol (TCP) bus.

Figure 2:
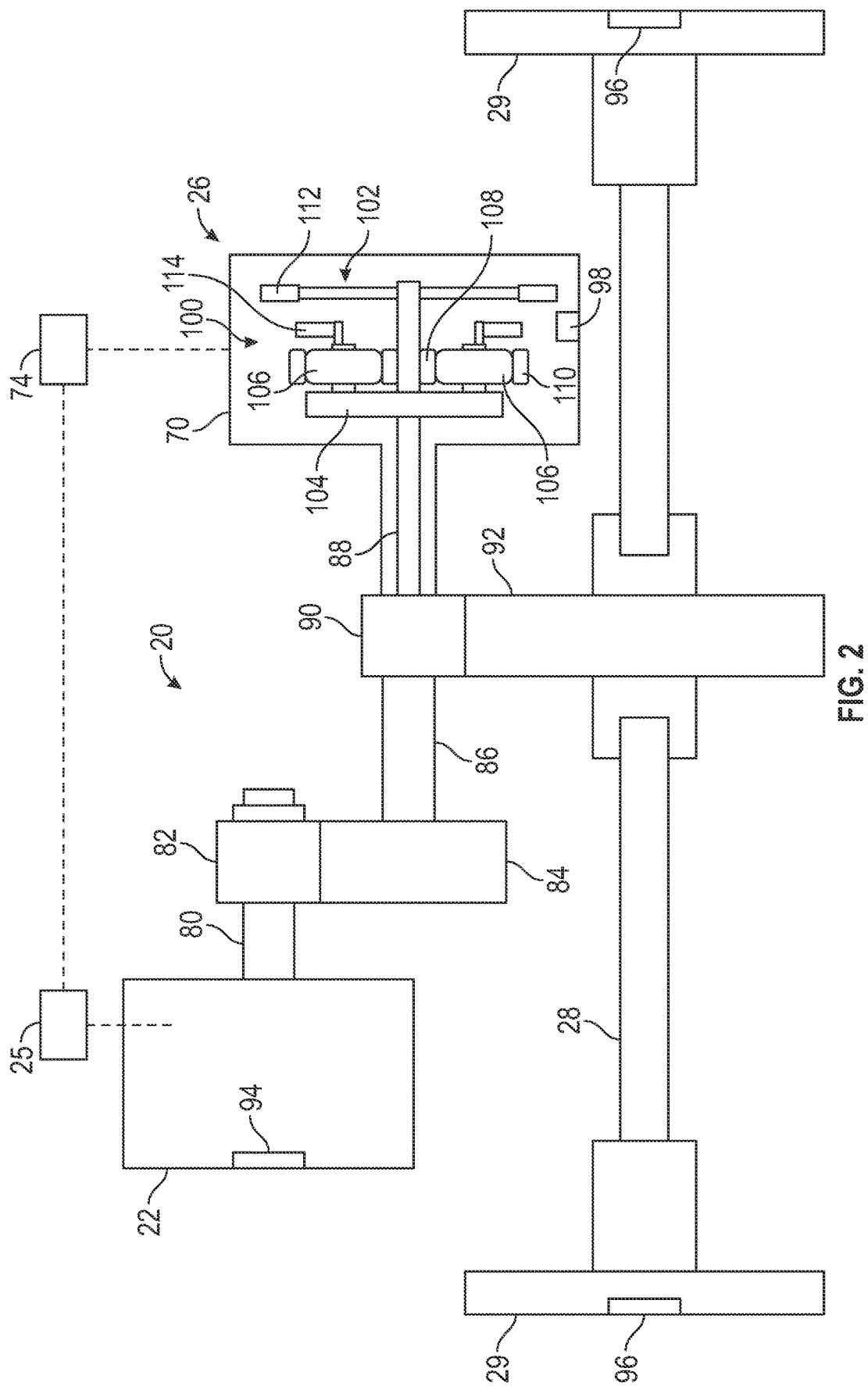
FIG. 2 depicts an electric motor and a transmission system of a vehicle, the transmission system including a gear system and controllers for controlling the transmission system, in accordance with an exemplary embodiment.

FIG. 2 depicts an example of the drive system 20 and the transmission system 26. In this example, the transmission system 26 includes a gear system configured to provide two speeds or transmission states. Although only the drive system 20 and the transmission system 26 are shown, it is to be understood that the drive system 30 (rear drive system) and the transmission system 36 include a similar gear system.

Embodiments are not limited to the number of drive systems shown in FIG. 1 or the gear system shown in FIG. 2. For example, the vehicle 10 may have any number of drive systems and associated transmissions. In addition, the transmission systems are not limited to that shown in FIG. 2, as the transmission systems may have more than two transmission states and/or utilize any other suitable type of gear system or transmission (e.g., a dual-clutch transmission (DCT) or other type of step gear transmission).

The motor 22 is connected to a motor shaft 80 and a motor shaft gear 82. The motor shaft gear 82 engages with a transfer gear 84 that is connected to a transfer shaft 86. Torque from the motor 22 is transferred to the transmission 26 via a clutch shaft 88, and an output torque from the transmission 26 is provided to a transfer gear 90 and a drive gear 92 of the drive shaft 28.

The transmission 26 includes a planetary gear set 100 and a clutch system 102. The planetary gear set 100 includes a carrier 104 connected to planetary gears 106, a sun gear 108 and a ring gear 110.

The clutch system 102 includes a first clutch 112 and a second clutch 114. It is noted that, although the transmission system of FIG. 2 is shown as having two clutches, embodiments are not so limited and can have any number of clutches.

In this embodiment, the clutches 112 and 114 are clutches for transmitting torque, which may be friction-type clutches (controlled, for example, hydraulically or electro-mechanically) or mechanical clutches such as dog clutches and/or selectable one way clutches (SOWC). It is noted that the clutches 112 and 114 may each be of any suitable type.

The first clutch 112 (C1) controls a connection between the sun gear 108 and a ground or immobile state. The first clutch 112 may transfer torque in only one direction (a "positive" direction) using a SOWC, or may transfer torque in two directions (i.e., the positive direction and an opposing negative direction). For a rotation in the positive direction, if the speed of the motor 22 is reduced or brought to zero, the first clutch 112 can continue to rotate, thereby storing the rotational energy imparted to it by the motor. The second clutch 114 engages or disengages the ring gear 110 to and from the carrier 104.

The planetary gear set 100 can operate to provide a number of gear ratios. In an embodiment, the gear set is operable between a first transmission state having a first gear ratio and a second transmission state having a second gear ratio.

For example, the first gear ratio is a non-unitary gear ratio (e.g., a "low gear" ratio less than a 1:1 ratio), while the second gear ratio is unitary (e.g., a "high gear" ratio of 1:1). The first gear ratio is established by engaging (closing) the first clutch 112 to lock the sun gear 108 to ground, thereby immobilizing the sun gear 108. The second clutch 114 is disengaged (open). Torque from the motor 22 is transferred via the clutch shaft 88 to the carrier 104 and then to the ring gear 110 via the planetary gears 106. The rotation of the ring gear 110 is then transferred to the transfer gear 90 and the drive gear 92. The torque is thus transferred to the drive shaft 28.

To establish the second gear ratio, the first clutch 112 is opened (or maintained in an open position, and the second clutch 114 is engaged to lock the carrier 104 to the ring gear 110. The torque from the motor 22 is provided to the carrier 104 via the clutch shaft 88, from the carrier 104 to the ring gear 110 and then to the transfer gear 90 and the drive gear 92 to turn the drive shaft and wheels 29.

The drive system 20 and/or the transmission system 26 may include various sensors. For example, sensors can be used by the controller 52 (or the controllers 25 and 74) to determine various operating parameters. Such sensors include, but are not limited to, a resolver 94 for determining motor position and/or motor speed, wheel speed sensors 96, and various torque and/or speed sensors 98 for estimating speeds of components such as the ring gear 110, the clutch 112 and/or the clutch 114.

Figure 3:
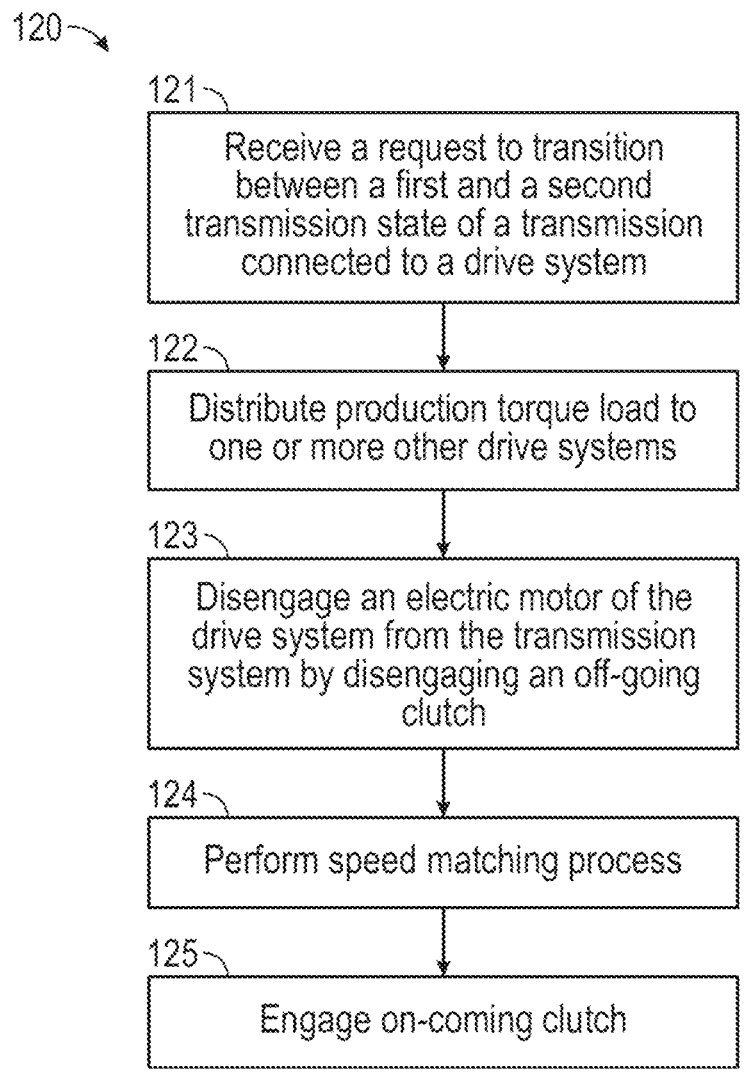
FIG. 3 is a flow diagram depicting aspects of a method of controlling vehicle propulsion and controlling transitions between transmission states, in accordance with an exemplary embodiment.

FIG. 3 illustrates embodiments of a method 120 of controlling a propulsion or drive system, and controlling transitions between transmission states of a drive system. Aspects of the method 120 may be performed by a processor or processors disposed in a vehicle, such as the controller 52, or a combination of processors. For example, the method can be performed by the MCP 25 in coordination with the TCM 74.

The method 120 is described in conjunction with the vehicle 10 of FIG. 1 and the drive and transmission systems of FIG. 2. However, the method 120 is not so limited and can be used with any suitable vehicle having any number of drive systems and transmissions. In addition, although the method is described as being initiated at the first drive system 20, the method 120 may be initiated at the second drive system 30.

The method 120 includes a number of steps or stages represented by blocks 121-125. The method 120 is not limited to the number or order of steps therein, as some steps represented by blocks 121-125 may be performed in a different order than that described below, or fewer than all of the steps may be performed.

At block 121, a request is received in a vehicle to transition a transmission connected to a first drive system, such as the drive system 20, from an initial transmission state to a target transmission state (e.g., between a first gear ratio and a second gear ratio). For example, a request is received at the TCM 74 (e.g., from a vehicle controller) to shift from a first gear ratio to a second gear ratio at the first transmission system 26. The request may be an upshift command requesting that the transmission system 26 shift from a low gear to a high gear, or a downshift command requesting a shift from the high gear to the low gear.

At block 122, the total propulsion torque load is distributed to one or more other drive systems so that the electric motor 22 in the first drive system 20 is in a no-torque or zero-torque mode, in which the motor 22 does not apply any propulsion torque to the vehicle. For example, the MCP 25 receives a request from the TCM 74 and treats the TCM request as a highest priority. The MCP 25 immediately (or as quickly as feasible) coordinates with the second drive system 30 to distribute the propulsion torque from the first drive system 20 to the second drive system 30 so that the second drive system 30 provides all of the propulsion torque, and the electric motor 22 of the first drive system 20 does not provide any torque to the vehicle 10.

At block 123, the electric motor 22 in the first drive system 20 is put into a zero-torque mode, and then subsequently disengaged from the transmission (put into a neutral state). A "zero-torque" mode is a mode in which the requested or commanded torque is zero (i.e., a request or command has been sent to a motor control unit or motor controller to cause the motor to apply zero torque).

To put the motor 22 in the neutral state, an initially engaged clutch (the "off-going clutch") is disengaged. For example, if the initial transmission state is a low gear state in which the first clutch 112 is engaged and the second clutch 114 is disengaged, the first clutch 112 is the off-going clutch and is quickly and fully released ("dumped") so that both clutches are disengaged. If the initial transmission state is a high gear state in which the first clutch 112 is disengaged and the second clutch 114 is engaged, the second clutch 114 is the off-going clutch and is dumped.

At block 124, a speed matching process is performed by controlling the rotational speed of the motor 22 (motor speed) to match the motor speed to an output speed of the transmission system 26. The motor speed is matched based on a speed relation between components of the transmission system 26 associated with the target transmission state. The motor speed may be controlled in a gradual manner to provide a smooth transition.

For example, if the target transmission state is the low gear state, the motor speed of the motor 22 is increased according to a speed relation between the carrier 104, the ring gear 110 (and output speed of the transmission 26) and the sun gear 108 associated with the low gear state. If the target transmission state is the high gear state, the motor speed is decreased to match the motor speed to the rotational speed of the ring gear 110 (ring gear speed), so that the motor speed is equal to the ring gear speed or within a selected range of the ring gear speed.

At block 125, an initially disengaged clutch (i.e., the clutch that was disengaged in the initial transmission state, also referred to as an "on-coming clutch") is engaged to put the transmission system 26 into the target transmission state. The on-coming clutch is engaged by applying a force thereto until a slip speed of the clutch is zero.

In an embodiment, the vehicle 10 includes an energy recovery system or is otherwise configured to feed torque back to the drive train (as negative torque). Energy recovery and/or braking torque may be used to reduce the motor speed either prior to engaging the on-coming clutch or during engagement (as force is applied to the clutch).

After then on-coming clutch is engaged and the transmission is in the target transmission, propulsion torque may be re-distributed so that the transmission of the first drive system 20 again applies torque to the vehicle 10. In an embodiment, the transmission(s) of one or more other drive systems can be shifted as discussed above by distributing torque away from another drive system and shifting as discussed at blocks 123-125.

As noted herein, the method 120 is not limited to use with transmissions having two clutches, as the method can be applied to systems having any number of clutches. For example, for a transmission with more than two clutches, there may be multiple off-going clutches and/or multiple on-going clutches.

Figure 4A:
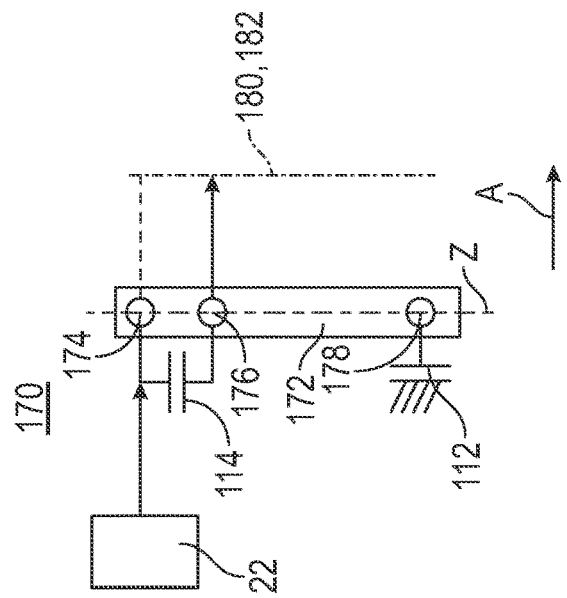
FIGS. 4A-4C schematically depict an electric motor and components of a transmission system, and depict aspects of an example of use of the method of FIG. 3 to upshift from a low gear state to a high gear state.
Figure 4B:
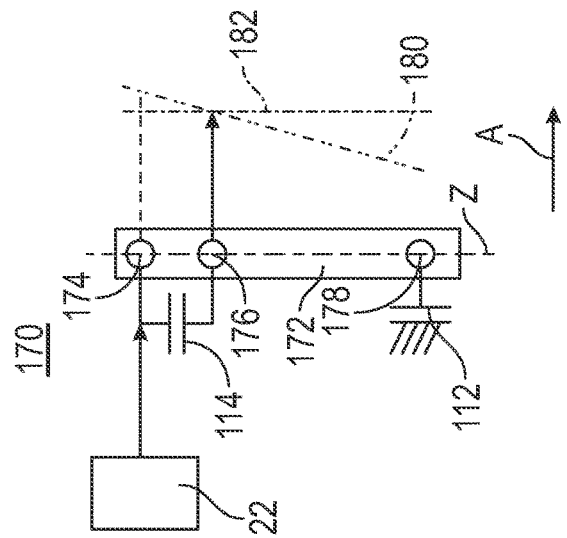
Figure 4C:
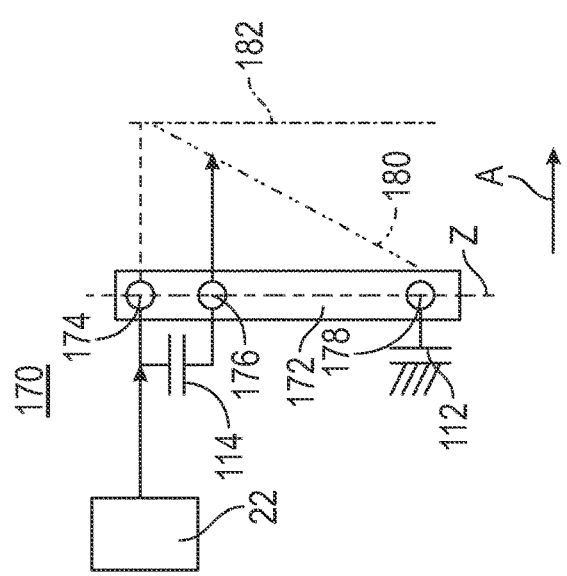
Figure 5A:
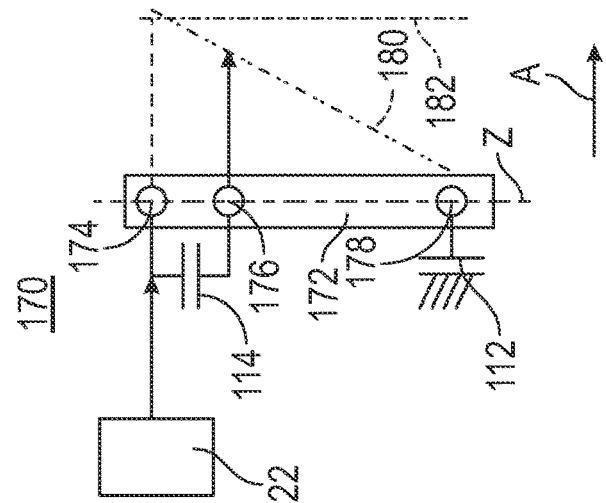
FIGS. 5A-5C schematically depict an electric motor and components of a transmission system, and depict aspects of an example of use of the method of FIG. 3 to downshift from a high gear state to a low gear state.
Figure 5B:
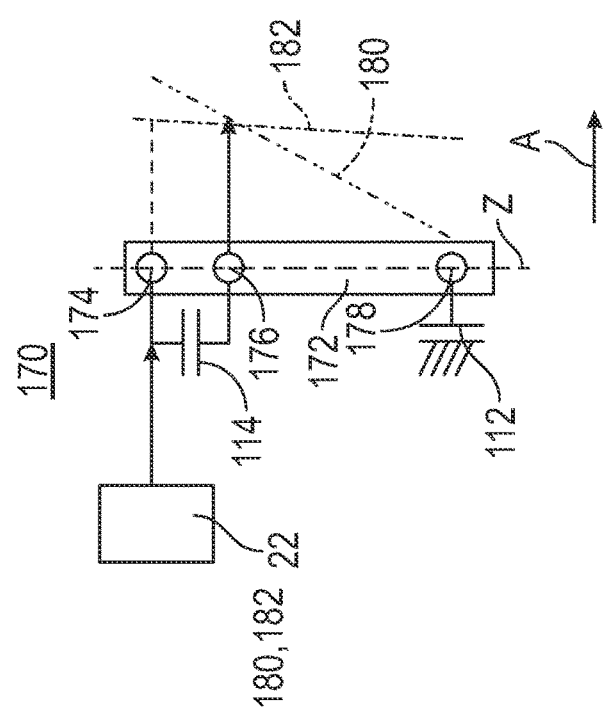
Figure 5C:
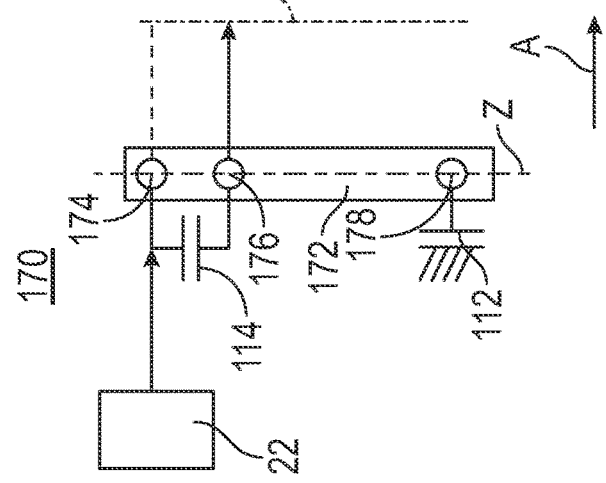

FIGS. 4A-4C depict aspects of an example in which the transmission 70 is upshifted, or shifted from a low gear state having a lower gear ratio (1:x, where x is less than one) to a high gear state having a higher gear ratio (e.g., 1:1). FIGS. 5A-5C depict aspects of an example in which the transmission 70 is downshifted, or shifted from the high gear state to the low gear state.

In these examples, speed relations between components of the drive unit 20 and the transmission 70 are represented schematically by a speed diagram 170. A lever 172 corresponds to the layout of components in FIG. 2, and indicates mathematically the relations between the rotational speeds of the components of the transmission system 26. A component is represented vertically along the lever 172 to indicate the spatial locations of the components with respect to each other. The motor 22, the first clutch 112 (C1) and the second clutch 114 (C2) are also schematically represented.

A lever point 174 represents the rotational speed of the ring gear 110 and output speed, a lever point 176 represents the motor speed (i.e., rotational speed of the motor 22) and carrier speed (rotational speed of the carrier 104), and a lever point 178 represents the rotational speed of the sun gear 108 and the rotational speed of first clutch 112 (i.e., speed of the clutch plate, referred to as a "first clutch speed").

The speeds can be represented graphically by tilting the lever 172 to show the relative speeds of each component. When the lever 172 is vertical (i.e., extends in the direction of a zero-speed axis Z that is perpendicular to an axis A), the motor speed, output speed and first clutch speed are zero. When the lever 172 is tilted, at least two components have a non-zero speed, and the speeds of the components are defined by a speed relation. A non-zero speed of a given component corresponds to a horizontal distance along the axis A from the zero-speed axis Z. The tilt of the lever 172 is represented by a speed line 180. The motor speed is also represented by a motor speed line 182.

FIG. 4A shows the drive unit 20 when the transmission 70 is in the low gear state. The first clutch 112 (C1) is engaged (closed) so that the sun gear 108 is stationary, and the second clutch 114 (C2) is disengaged (open). In this state, the motor speed (denoted as "MGU-spd") is higher than the output speed (denoted as "Out"), and the first clutch speed is zero. This is illustrated by the speed line 180 defining an acute angle with the zero-speed axis Z.

When a request to upshift is received, torque is distributed to the drive unit 30, and subsequently the first clutch 112 (C1) is opened so that the motor 22 does not provide any torque to the vehicle wheels.

During the shifting process, the first clutch speed and the rotational speed of the sun gear 108 begins to increase, as shown in FIG. 4B. The motor speed is reduced to be equal to the output speed, as represented by the intersection of speed lines 180 and 182. At this point, the clutch speed (relative speeds of the flywheel and clutch plate) of the second clutch 114 (C2) is zero. The second clutch 114 (C2) can then be engaged, and the transmission 26 is in the high gear state (motor speed and output speed are equal) as shown in FIG. 4C.

FIG. 5A shows the drive unit 20 when the transmission 26 is in the high gear state. The first clutch 112 (C1) is open, and the second clutch 114 (C2) is engaged, which locks the ring gear 110 to the carrier 104. In this state, the motor speed MGU-spd is equal to the output speed (Out). The speeds of the sun gear 108 (and C1 clutch plate), the ring gear 110, and the carrier 104 are equal to the motor speed and the second clutch speed (relative speeds of the clutch plate and flywheel) is zero.

When a request to downshift is received, torque is distributed to the drive unit 30, and subsequently the second clutch 112 (C2) is opened so that the motor 22 does not provide any torque to the vehicle wheels.

During the shifting process, the motor speed is increased. FIG. 5B shows the motor speed as the motor 22 is accelerating, showing an intermediate speed that exceeds the rotational speed of the output. The motor speed is increased until the motor speed satisfies the speed relation of the low gear state, as shown by speed line 180 of FIG. 5C.

Figure 6:
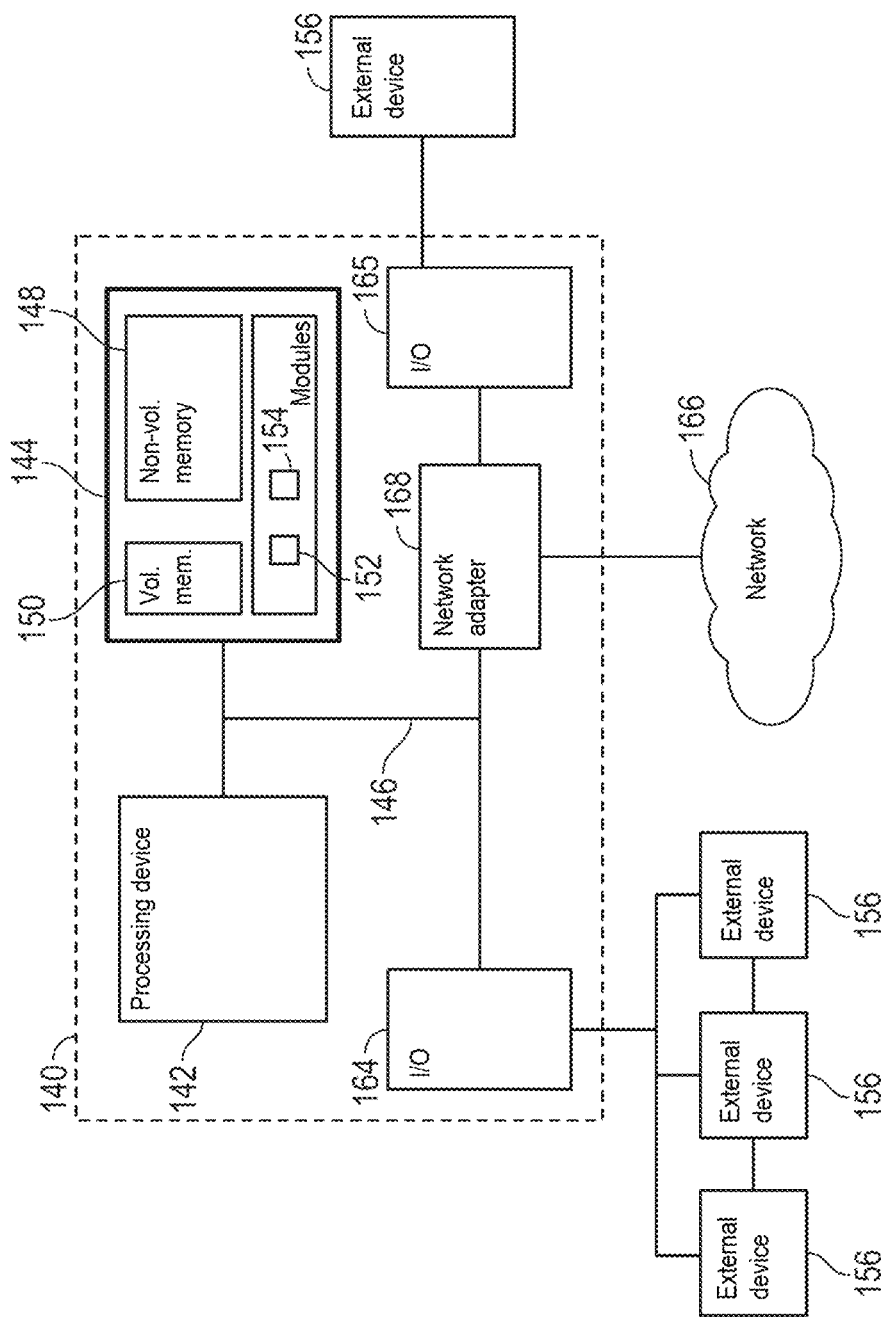
FIG. 6 depicts a computer system in accordance with an exemplary embodiment.

FIG. 6 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to receiving requests and controlling transmission components, and a module 154 may be included to perform functions related to control of motor speed as discussed herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for controlling a transmission state of a vehicle, comprising:
a controller connected to a first drive system and a first transmission connected to the first drive system, the first drive system including an electric motor, the first transmission including a gear system, a first clutch and a second clutch, the controller configured to perform:
receiving a request to change from an initial transmission state to a target transmission state when a propulsion torque is being applied to the vehicle, wherein one of the first clutch and the second clutch is an off-going clutch that is engaged with the gear system and a drive shaft of the vehicle in the initial transmission state, and another of the first clutch and the second clutch is an on-coming clutch that is disengaged from the gear system and the drive shaft in the initial transmission state and a second drive system is disengaged from the drive shaft;
distributing the propulsion torque such that all of the propulsion torque is applied by the second drive system and the first drive system does not provide any propulsion torque to the vehicle, wherein distributing the propulsion torque includes engaging the second drive system with the drive shaft;
fully releasing the off-going clutch from the gear system;
controlling a motor speed based on a rotational speed relation of the target transmission state to reduce a slip speed of the on-coming clutch; and
fully engaging the on-coming clutch to put the first drive system in the target transmission state.

2. The system of claim 1, wherein the second drive system is configured to transfer torque to a different drive shaft than the first drive system.

3. The system of claim 1, wherein the controller is further configured to perform:
re-distributing the propulsion torque such that the second drive system does not provide any propulsion torque to the vehicle, the second drive system connected to a second transmission; and
changing a transmission state of the second transmission from a first transmission state to a second transmission state.

4. The system of claim 1, wherein the gear system includes a carrier rotationally coupled to the electric motor and supporting a plurality of planet gears, a sun gear, and a ring gear rotationally coupled to an output of the transmission, and wherein the first clutch is operable to immobilize the sun gear, and the second clutch is operable to rotationally couple the electric motor and the carrier to the ring gear.

5. The system of claim 4, wherein, the first transmission has a low gear state in which the first clutch is the off-going clutch and the second clutch is the on-coming clutch, and a high gear state in which the first clutch is the on-coming clutch and the second clutch is the off-going clutch.

6. The system of claim 5, wherein the initial transmission state is the low gear state and the target transmission state is the high gear state, and controlling the motor speed includes reducing the motor speed to match the motor speed to a rotational speed of the ring gear.

7. The system of claim 5, wherein the initial transmission state is the high gear state and the target transmission state is the low gear state, and controlling the motor speed includes increasing the motor speed based on the rotational speed relation of the low gear state.

8. The system of claim 1, wherein the controller includes a first controller configured to control the rotational speed of the electric motor and a second controller configured to control operation of the first transmission.

9. The system of claim 8, wherein the system is configured to control the transmission state based on a coordination between the first controller and the second controller.

10. A method of controlling a transmission state of a vehicle, comprising:
receiving at a controller a request to change from an initial transmission state to a target transmission state when a propulsion torque is being applied to the vehicle, the controller connected to a first drive system and a first transmission, the first drive system including an electric motor, the first transmission including a gear system, a first clutch and a second clutch, wherein one of the first clutch and the second clutch is an off-going clutch that is engaged with the gear system and a drive shaft of the vehicle in the initial transmission state, and another of the first clutch and the second clutch is an on-coming clutch that is disengaged from the gear system and the drive shaft in the initial transmission state, wherein a second drive system is disengaged from the drive shaft in the initial transmission state;
distributing the propulsion torque such that all of the propulsion torque is applied by the second drive system and the first drive system does not provide any propulsion torque to the vehicle, wherein distributing the propulsion torque includes engaging the second drive system with the drive shaft;
fully releasing the off-going clutch from the gear system;
controlling a motor speed based on a rotational speed relation of the target transmission state to reduce a slip speed of the on-coming clutch; and
fully engaging the on-coming clutch to put the first drive system in the target transmission state.

11. The method of claim 10, further comprising re-distributing the propulsion torque so that at least a portion of the propulsion torque is applied by the first drive system.

12. The method of claim 10, further comprising:
re-distributing the propulsion torque such that the second drive system does not provide any propulsion torque to the vehicle, the second drive system connected to a second transmission; and
changing a transmission state of the second transmission from a first transmission state to a second transmission state.

13. The method of claim 10, wherein the gear system includes a carrier rotationally coupled to the electric motor and supporting a plurality of planet gears, a sun gear, and a ring gear rotationally coupled to an output of the transmission, and wherein the first clutch is operable to immobilize the sun gear, and the second clutch is operable to rotationally couple the electric motor and the carrier to the ring gear.

14. The method of claim 13, wherein the first transmission has a low gear state in which the first clutch is the off-going clutch and the second clutch is the on-coming clutch, and a high gear state in which the first clutch is the on-coming clutch and the second clutch is the off-going clutch.

15. The method of claim 14, wherein the initial transmission state is the low gear state and the target transmission state is the high gear state, and controlling the motor speed includes reducing the motor speed to match the motor speed to a rotational speed of the ring gear.

16. The method of claim 14, wherein the initial transmission state is the high gear state and the target transmission state is the low gear state, and controlling the motor speed includes increasing the motor speed based on the rotational speed relation of the low gear state.

17. A vehicle system comprising:
a first drive system;
a first transmission coupled to the first drive system; and
a processing device for executing computer readable instructions from a memory, the computer readable instructions controlling the processing device to perform a method including:
receiving at a controller a request to change from an initial transmission state to a target transmission state when a propulsion torque is being applied to a vehicle, the controller connected to the first drive system and the first transmission, the first drive system including an electric motor, the first transmission including a gear system, a first clutch and a second clutch, wherein one of the first clutch and the second clutch is an off-going clutch that is engaged with the gear system and a drive shaft of the vehicle in the initial transmission state, and another of the first clutch and the second clutch is an on-coming clutch that is disengaged from the gear system and the drive shaft in the initial transmission state, wherein a second drive system is disengaged from the drive shaft in the initial transmission state;
distributing the propulsion torque such that all of the propulsion torque is applied by the second drive system and the first drive system does not provide any propulsion torque to the vehicle;
fully releasing the off-going clutch from the gear system;
controlling a motor speed based on a rotational speed relation of the target transmission state to reduce a slip speed of the on-coming clutch; and
fully engaging the on-coming clutch to put the first drive system in the target transmission state.

18. The vehicle system of claim 17, wherein the gear system includes a carrier rotationally coupled to the electric motor and supporting a plurality of planet gears, a sun gear, and a ring gear rotationally coupled to an output of the transmission, and wherein the first clutch is operable to immobilize the sun gear, and the second clutch is operable to rotationally couple the electric motor and the carrier to the ring gear.

19. The vehicle system of claim 17, wherein the first transmission has a low gear state in which the first clutch is the off-going clutch and the second clutch is the on-coming clutch, and a high gear state in which the first clutch is the on-coming clutch and the second clutch is the off-going clutch.

20. The vehicle system of claim 19, wherein controlling the motor speed includes at least one of:
reducing the motor speed to match the motor speed to a rotational speed of the ring gear based on the initial transmission state being the low gear state and the target transmission state being the high gear state; and
increasing the motor speed based on the rotational speed relation of the low gear state based on the initial transmission state being the high gear state and the target transmission state being the low gear state.

* * * * *